United States Patent [19]

Takenaka et al.

[11] Patent Number: 5,448,751
[45] Date of Patent: Sep. 5, 1995

[54] METHOD AND APPARATUS FOR ASSIGNING RADIO CHANNELS IN MOBILE COMMUNICATIONS SYSTEMS

[75] Inventors: Tetsuyoshi Takenaka; Tadashi Nakamura; Yoshiharu Tajima, all of Kawasaki, Japan

[73] Assignee: Fujitsu Limited, Kanagawa, Japan

[21] Appl. No.: 45,015

[22] Filed: Apr. 8, 1993

[30] Foreign Application Priority Data

Apr. 10, 1992 [JP] Japan ................... 4-090990

[51] Int. Cl.[6] .................. H04Q 7/00; H04B 15/00
[52] U.S. Cl. .................. 455/33.1; 455/54.1; 455/56.1; 455/62
[58] Field of Search ............... 455/62, 63, 67.1, 67.3, 455/33.1, 33.4, 56.1, 53.1, 34.1, 34.2, 33.2, 38.3; 379/59, 58, 60, 61, 63

[56] References Cited

U.S. PATENT DOCUMENTS

| | | | |
|---|---|---|---|
| 4,144,411 | 3/1979 | Frenkel | 379/59 |
| 5,189,734 | 2/1993 | Bailey et al. | 455/33.2 |
| 5,214,789 | 5/1993 | George | 455/33.2 |
| 5,280,630 | 1/1994 | Wang | 455/62 |
| 5,289,527 | 2/1994 | Tiedemann, Jr. | 455/54.2 |
| 5,293,943 | 3/1994 | Israelsson | 455/33.2 |

FOREIGN PATENT DOCUMENTS 3104329 5/1991 Japan .
3167924 7/1991 Japan .
9211736 7/1992 WIPO ................... 455/34.1

OTHER PUBLICATIONS

"Reuse Partitioning in Cellular Systems", Samuel W. Halpern, Bell Laboratories, 1983, 421 EEE, pp. 322–327.
"Autonomous Reuse Partitioning in Cellular Systems", Toshihito Kanai, 421EEE VTC, 1992, pp. 782–785.
"Layout and Control of High Capacity Systems:", John Wiley & Sons, Microwave Mobile Communications, 1991.

Primary Examiner—Edward F. Urban
Assistant Examiner—Lisa Charouel

[57] ABSTRACT

There is provided a method and an apparatus for assigning a radio channel between base and mobile stations in a mobile communication system, which provide advantages of first available and reuse partitioning systems and do not cause as great a proportional increase in a processing amount as an ARP system. A radio zone is divided into a number of regions having the same area which is equal to channel number N, usable in an entire system by concentric circles centering on a base station 12. Channels 1 to $N_s$ are allotted to the respective regions. Upon the issuance of a channel assignment request, a channel corresponding to the region where the mobile station is located or its neighboring channels is assigned preferentially.

17 Claims, 16 Drawing Sheets

METHOD AND APPARATUS FOR ASSIGNING RADIO CHANNELS IN MOBILE COMMUNICATIONS SYSTEMS

BACKGROUND OF THE INVENTION

1. Field of the Invention

This invention relates to a method and an apparatus for assigning radio channels between base stations (BSs) and mobile stations (MSs) in a mobile communication system such as an automobile telephone system or a portable telephone system.

Recently, the number of people who want to subscribe to a mobile communication system such as an automobile telephone system or a portable telephone is increasing. However, there are only limited frequency bands available for this purpose. In view of this, it is required to meet this large demand by effectively utilizing the limited frequency bands available.

2. Description of the Related Art

In a mobile communication system such as an automobile telephone system or a portable telephone system, in order to respond to a demand which is increasing year by year, the area (zone or cell) covered by each BS is reduced by subdividing the zone and the utilization of frequencies is enhanced by repeatedly using the same frequency band since the interference is small between well spaced zones.

The most easily controllable system of those presently put into practical use is a fixed channel assignment (FCA) system. According to this system, radio channel groups are allotted to the respective zones beforehand in a fixed manner in accordance with wave propagating environments and estimated traffic distribution lest interzone interferences should occur, when the system is designed. If a channel assignment requirement is issued in response to origination or reception of a call in each zone, radio channels are assigned sequentially from the radio channel group allotted to that zone.

However, with the FCA system, it is difficult to flexibly cope with variation or temporary change of traffic due to a change in demand after the system is built or a change in the wave propagation environment caused by buildings built thereafter. Further, a division loss, which results from the fact that the channels are divided into a plurality of channel groups, leads to a limited capacity for subscribers.

Accordingly, in order to flexibly cope with the traffic variation and the wave propagation environment so as to meet an increase in the number of subscribers, a dynamic channel assignment (DCA) system is proposed in which usable radio channels are not separately allotted to the respective zones in the fixed manner, but are treated as resources shared by all of the zones.

As one type of the DCA system, for example, there is proposed a first available (FA) system in which each BS autonomously retrieves the radio channels from among the shared resources in a random sequence when an assignment requirement is issued by the BS in charge of the respective zones, and the radio channel which has first satisfied an assignment condition is assigned. The assignment condition is: the radio channel is not used in the BS and has a SNR (signal power to noise ratio) or CIR (carrier power to interference ratio) not smaller than a reference value. By setting the assignment condition in this way, more radio channels can be assigned to such a zone that must accommodate larger traffic compared to surrounding radio zones and the division loss which occurs when the FCA system is adopted can be avoided since a population of the radio channels from which the respective BSs retrieve the assignment channels includes all the system channels.

However, since the radio channels are assigned at random regardless of the distance between the BSs and MSs (or the intensity of relative electric field strength) according to this system, the channels whose conditions are needlessly good may be assigned. In this system, maximizing the accommodated traffic in the entire system is not taken into account.

More specifically, when the MS is relatively close to the BS, the received power is high at both the MS and BS and the distance of the MS from the neighboring zones is ensured to be greater than a specified value. Accordingly, it can be ensured that the MS can resist interference from neighboring zones and the influence thereof to the neighboring zones is not higher than a specified level. Thus, it is possible to repeatedly use the same channel at spatially relatively short intervals because of less mutual interference between the MSs relatively closer to the BSs. In other words, efficient assignment is possible among small size clusters corresponding to areas inward of the zones. Conversely, the same channel can be repeatedly used at geographically relatively long intervals for the MSs distant from the BSs, i.e. efficient assignment is possible among large clusters corresponding to areas outward of the zones.

In a reuse partitioning (RUP) system, a spatially efficient assignment of radio channels is realized, based on this concept, by classifying the MSs into small clusters and large clusters in accordance with the distance between the BS and the MSs, by separately allotting two different channel groups to the small clusters and the large clusters, and by assigning the channels from the respective channel groups. According to this system, an average cluster size in overall channels is smaller than when the FCA system is adopted. In other words, the number of radio channels per one zone can be increased.

However, with this system, since the radio channel groups are allotted to the small clusters and to the large clusters in a fixed manner, only the averaged traffic in the entire zone is increased, but the traffic cannot be accommodated if the traffic becomes larger than the number of channels allotted to one of the clusters, thus causing a division loss similar to the FCA system.

"Autonomous Reuse Partitioning (ARP) in Microcellular Systems" by Kanai, Technical Study Report, IEICE, RCS91-32, 1991, discloses, as one of the FA systems, a method according to which a retrieval sequence common for all the zones is determined in a fixed manner, the respective BSs autonomously retrieve channels in accordance with this common sequence, and the first found channel is assigned, consequently realizing the efficient assignment similar to the RUP system.

However, with this ARP system, since all the BSs retrieve channels in the same sequence regardless of the distance between the BS and MS, the number of channels to be searched increases as the traffic in the neighboring zones increases. Thus, this system suffers from the problem of a longer processing time and an increased frequency of required mutual communication.

SUMMARY OF THE INVENTION

As described above, the traffic to be accommodated cannot be maximized according to the FCA or FA system; the problem of division loss arises according to the FCA or RUP system; and a processing amount is increased according to the ARP system.

In view of this, an object of the invention is to provide a radio channel assigning method and an apparatus which provide advantages of the FA and RUP systems and do not cause a proportional increase in a processing amount.

According to the invention, there is provided a method of assigning radio channels between mobile stations and base stations in a mobile communication system, the radio channels being assignable as resources shared by all of the mobile stations, comprising the steps of:

i) determining correspondence between the radio channels and quantized distances between the mobile stations and the base stations;

ii) determining a distance between a mobile station and a base station between which a radio channel is to be assigned;

iii) determining a candidate for the radio channel to be assigned, using the distance determined in the step ii) in accordance with the correspondence determined in the step i);

iv) testing whether an assignment condition such that the candidate for the radio channel to be assigned is not in use in the base station and satisfies a predetermined reception condition is satisfied;

v) changing the candidate in accordance with predetermined order if the assignment condition in the step iv) is not satisfied;

vi) repeating the steps iv) and v) until the assignment condition is satisfied or all of the radio channels is tested; and vii) assigning the candidate between the mobile station and the base station if the assignment condition is satisfied.

According to the present invention, there is also provided an apparatus for assigning radio channels between mobile stations and base stations in a mobile communication system, the radio channels being assignable as resources shared by all of the mobile stations, comprising:

means for storing correspondence between the radio channels and quantized distances between the mobile stations and the base stations;

means for determining a distance between a mobile station and a base station between which a radio channel is to be assigned;

means for determining a candidate for the radio channel to be assigned, using the distance determined by the distance determining means in accordance with the correspondence stored in the storing means; and means for retrieving a radio channel which is not in use in the base station and satisfies a predetermined reception condition, starting from the candidate determined by the candidate determining means, in accordance with predetermined order.

Since the first candidate is determined from the distance in accordance with the correspondence between the base station-to-mobile station distance and the radio channel, the reuse partitioning can be realized more accurately. When the first candidate is already in use in the base station or the predetermined reception condition is not satisfied due to the high interference level because the channel is in use in the neighboring zones, a search is made through all the radio channels in accordance with the predetermined sequence. Therefore, the problem of division loss does not occur. Further, since the first candidate is determined according to the distance, the processing amount is not increased in proportion to the traffic in the neighboring zones.

DESCRIPTION OF THE PREFERRED EMBODIMENTS

There is first described an exemplary method of determining correspondence between a BS-to-MS distance and a radio channel and determining a candidate for an assignment channel from the BS-to-MS distance in accordance with the determined correspondence. It will be appreciated that the BS-to-MS distance is not merely a physical distance but a distance obtained by adding a factor of wave propagation environments to the physical distance. For instance, even when the MS is physically close to the BS, the distance is estimated to be longer if a wave obstruction stands between the MS and BS since a receiver power is weak similarly to the case where the MS is distant from the BS. This distance can be estimated based on the intensity of a received electric field as described later. However, it is of course possible to realize an essential part of the invention even when the physical distance is used.

Figure 1:
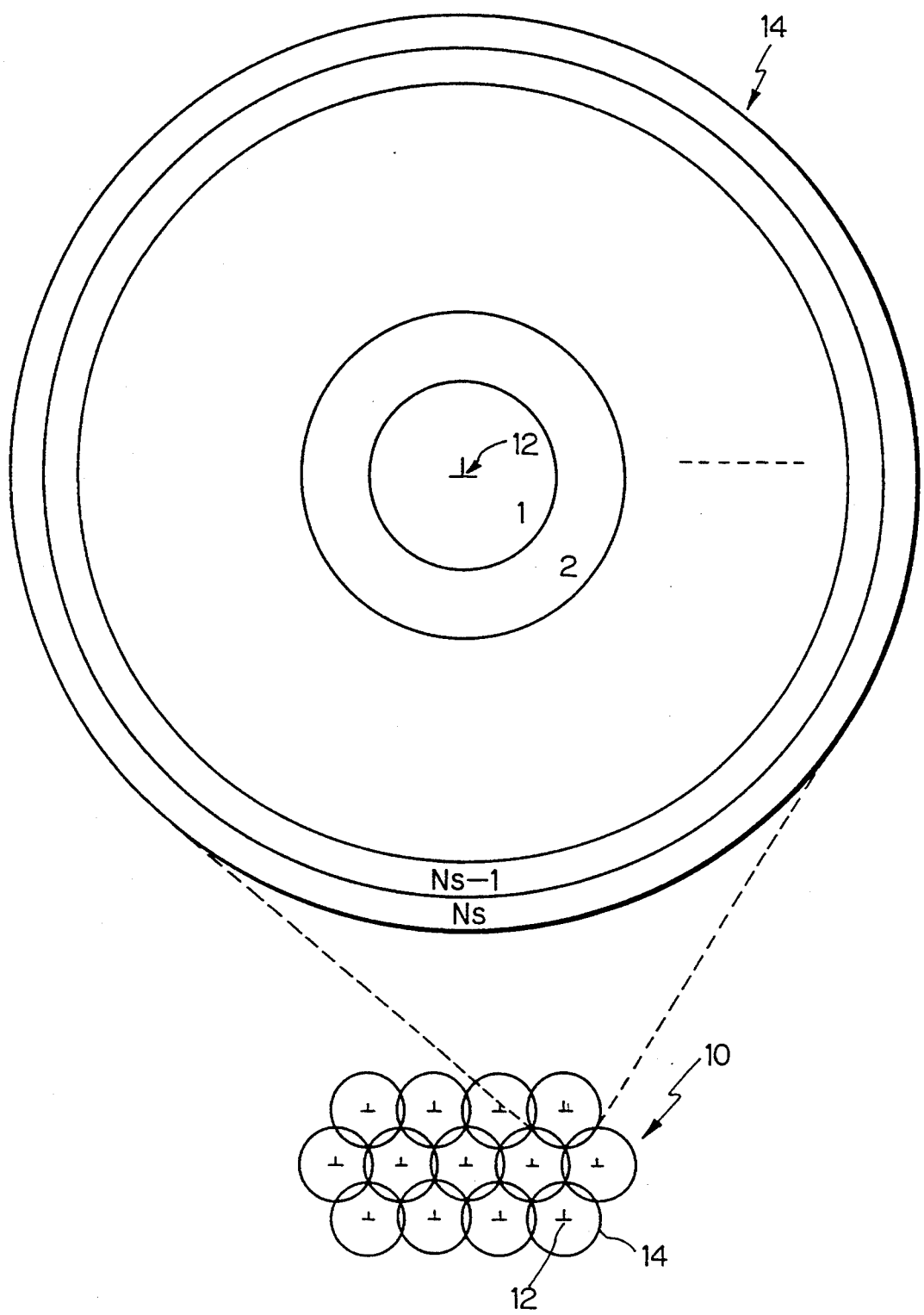
FIG. 1 is a diagram for explaining a method of determining a candidate channel according to the invention.

FIG. 1 is a diagram for explaining an exemplary method of determining the correspondence between the distance and the radio channel. This figure is a conceptual plan view of radio zones 14 covered by one BS 12 out of a multitude of radio zones 14 included in a mobile communication system 10.

The number of usable radio channels in the entire mobile communication system 10 is represented by $N_s$. As shown in FIG. 1, the respective radio zones are divided into $N_s$ concentric circles. Radii of the concentric circles are determined so that an area of a portion held between two adjacent concentric circles is equal to an area of a most inward concentric circle. The radio channels corresponding to the respective concentric circles are numbered, such that, for example, one corresponding to the most inward radio channel is a first channel and one corresponding to a most outward radio channel is a $N_s$-th channel.

Here are described specific examples of determining the MS-to-BS distance based on the propagation loss and of selecting the radio channel corresponding to the determined distance. If a radius of the radio zone is represented by R, the area of the portion held between two adjacent concentric circles and the most inward concentric circle is represented by $S_0$; and a radius of the n-th concentric circle from the most inward one is represented by $r_n$, $$nS_0 = \pi r_n^2 \quad (1)$$

and $$S_0 = \pi R^2/N_s \quad (2)$$

Accordingly, the radius of the n-th concentric circle is:

$$r_n = R(n/N_s)^{\frac{1}{2}}, \; n = 1 \text{ to } N_s \quad (3)$$

A ratio of received electric field intensity in an n-th concentric circle to that in the most inward concentric circle represents a propagation loss using the most inward concentric circle as reference. If the received electric field intensity is assumed to be proportional to the (−a) power of the distance, the propagation loss $1_n$ is:

$$1_n = (r_n/r_1)^{-s} \quad (4)$$

If the equation (3) is put into the equation (4), $$\begin{aligned} l_n &= (R \, (n/N_B)^{\frac{1}{2}}/r_1)^{-a} \\ &= (R/r_1)^{-a}(n/N_g)^{-a/2} \end{aligned} \quad (5)$$

The equation (5) is expressed in a logarithmic form as follows.

$$\begin{aligned} L_n &= 10 \log (l_n) \\ &= 10 \log (R/r_1)^{-a} + 10 \log (n/N_g)^{-a/2} \\ &= -10a/2 \log (n/N_a) + 10 \log (R/r_1)^{-a} \, [dB] \end{aligned} \quad (6)$$

A second term of the equation (6) is a difference of the received electric field intensity between the most inward zone and the most outward zone, and is equivalent to a numerical value corresponding to a difference between maximum received power and minimum received power specified in system designing. Accordingly, $L_n$ (n = 1 to $N_s$) are calculated (quantized) beforehand in accordance with the equation (6), and the propagation loss L [dB] is measured upon the issuance of the radio channel assignment requirement, and $n_0$ satisfying the following relationship is determined:

$$L_{n0} < L < L_{n0+1} \quad (7)$$

Consequently, the $n_0$-th channel is decided as a primary candidate for an assignment channel.

As described in detail later, when the primary candidate is already in use in the BS or a specified reception condition (to be described later) is not satisfied due to high interference level because this channel is in use in a close zone even if this channel is not in use, the search is made according to priority given according to closeness to the primary candidate channel and the first channel found satisfying the condition is assigned.

By assigning the radio channel in this way, the radio channel can be assigned at equal probability for the respective radio channels on the assumption that existence probability of the MSs in the zone is uniform. In addition, the MSs having the same radio channel assigned thereto are equidistant from the BSs in any zone, thus realizing the exceedingly minute reuse partitioning.

Figure 2:
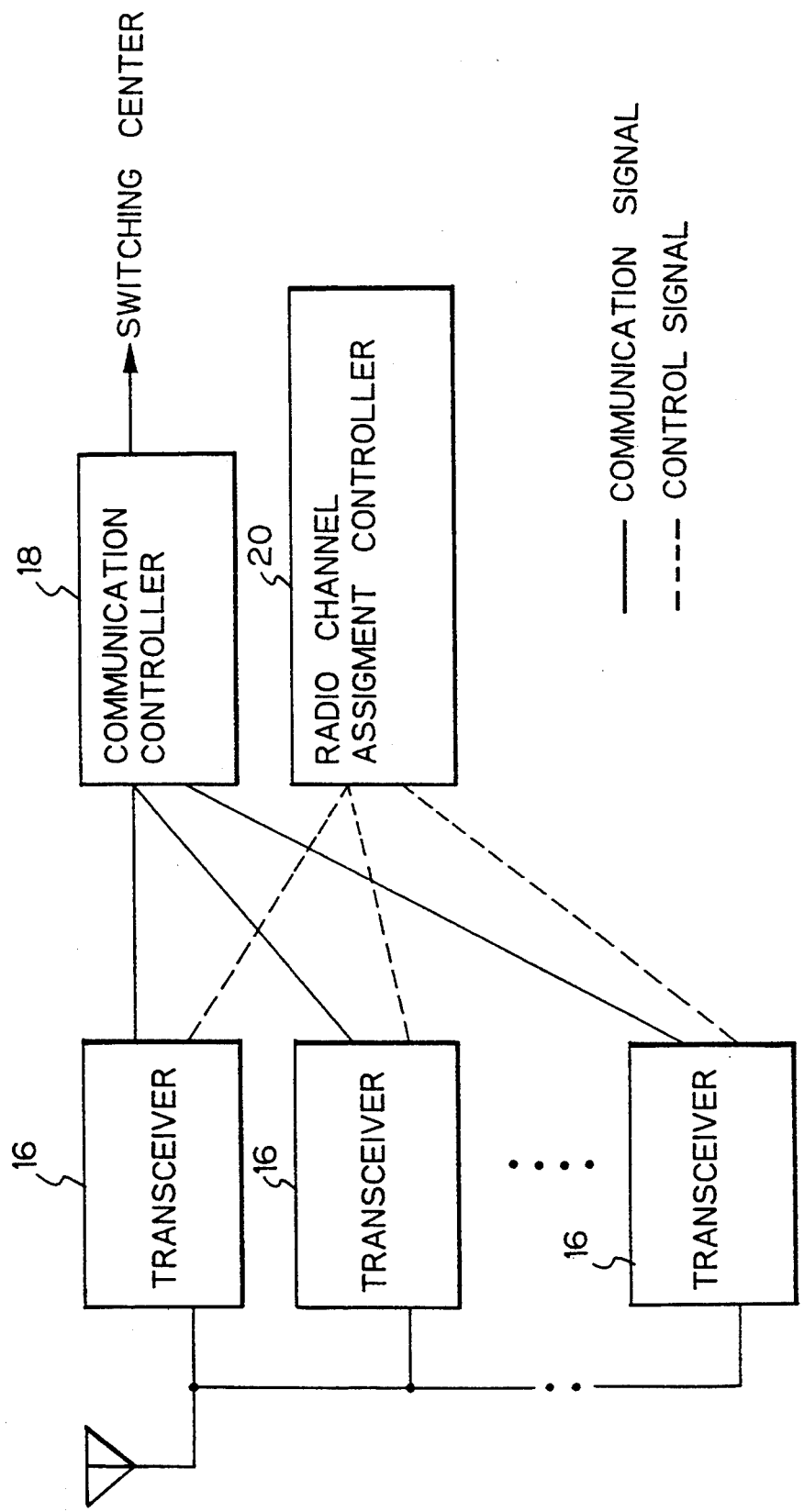
FIG. 2 is a diagram showing an exemplary construction of a mobile communication system according to the invention.
Figure 3:
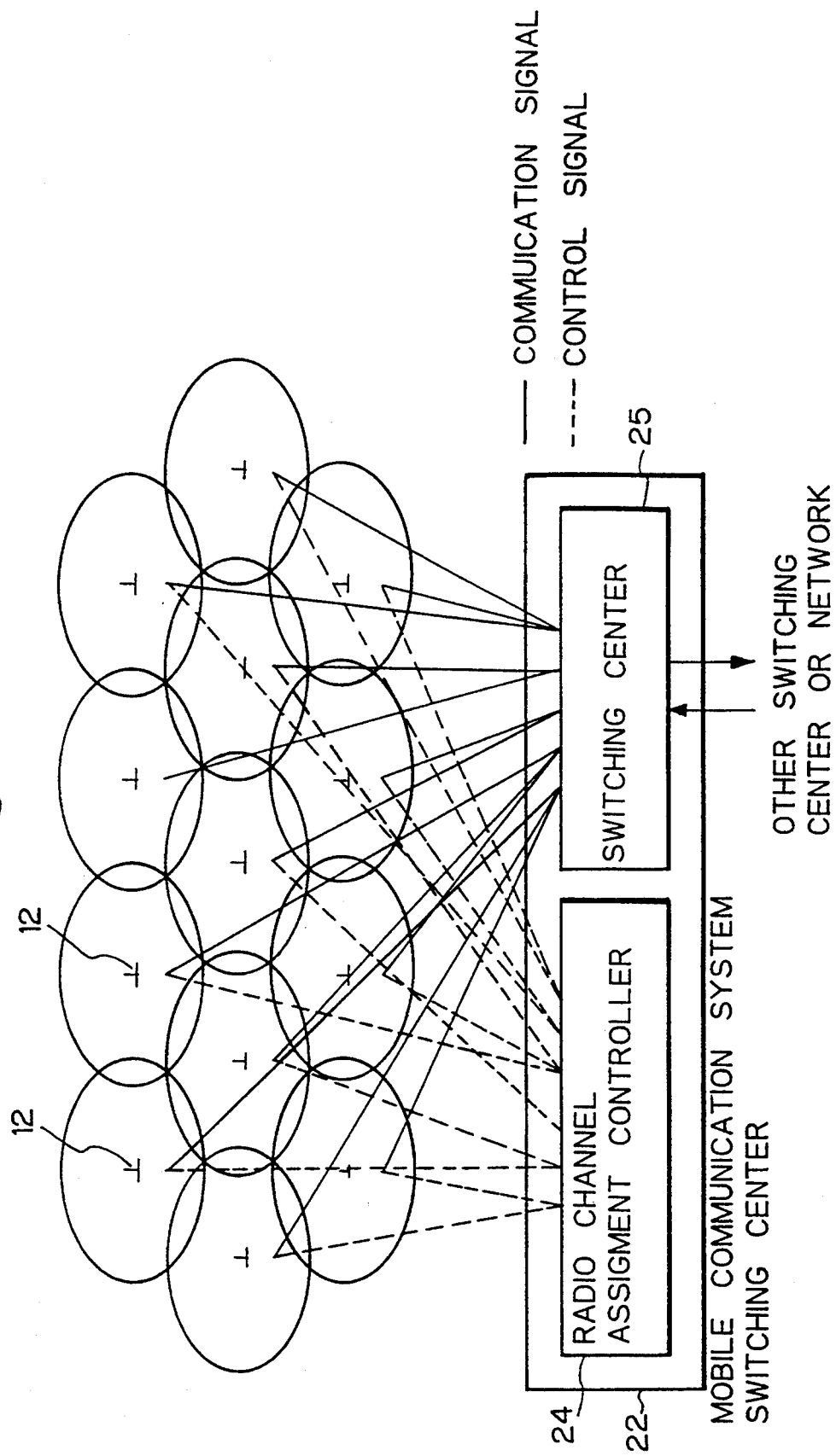
FIG. 3 is a diagram showing another exemplary construction of the mobile communication system according to the invention.

Since these processings are carried out independently in the respective zones, a radio channel assigning apparatus for realizing these processings may be provided in each BS or in each mobile communication system switching center for connecting a plurality of BSs with a switched network. FIGS. 2 and 3 are block diagrams showing exemplary constructions of the former and the latter respectively.

FIG. 2 shows the construction of a single BS 12. Indicated at 16 is a transceiver provided for each channel. A communication controller 18 controls the connection of the transceivers with the switching center. A radio channel assignment controller 20 assigns the radio channels to the MSs covered by the BS where it is provided.

FIG. 3 shows a plurality of BSs 12 and a mobile communication system switching center 22 connected with the BSs 12. A radio channel assignment controller 24 provided in the switching center 22 receives from the respective BSs radio channel assignment requirements between the plurality of BSs 12 connected with the switching center 22 and the MSs existing in the zone covered by each BS 12; carries out channel assignment processings in a unitary manner; and informs the respective BSs 12 of assignment results. Even in this case, only the processing means is used in common, but the assignment processings themselves are carried out independently for the respective BSs similar to the case shown in FIG. 2.

Figure 4:
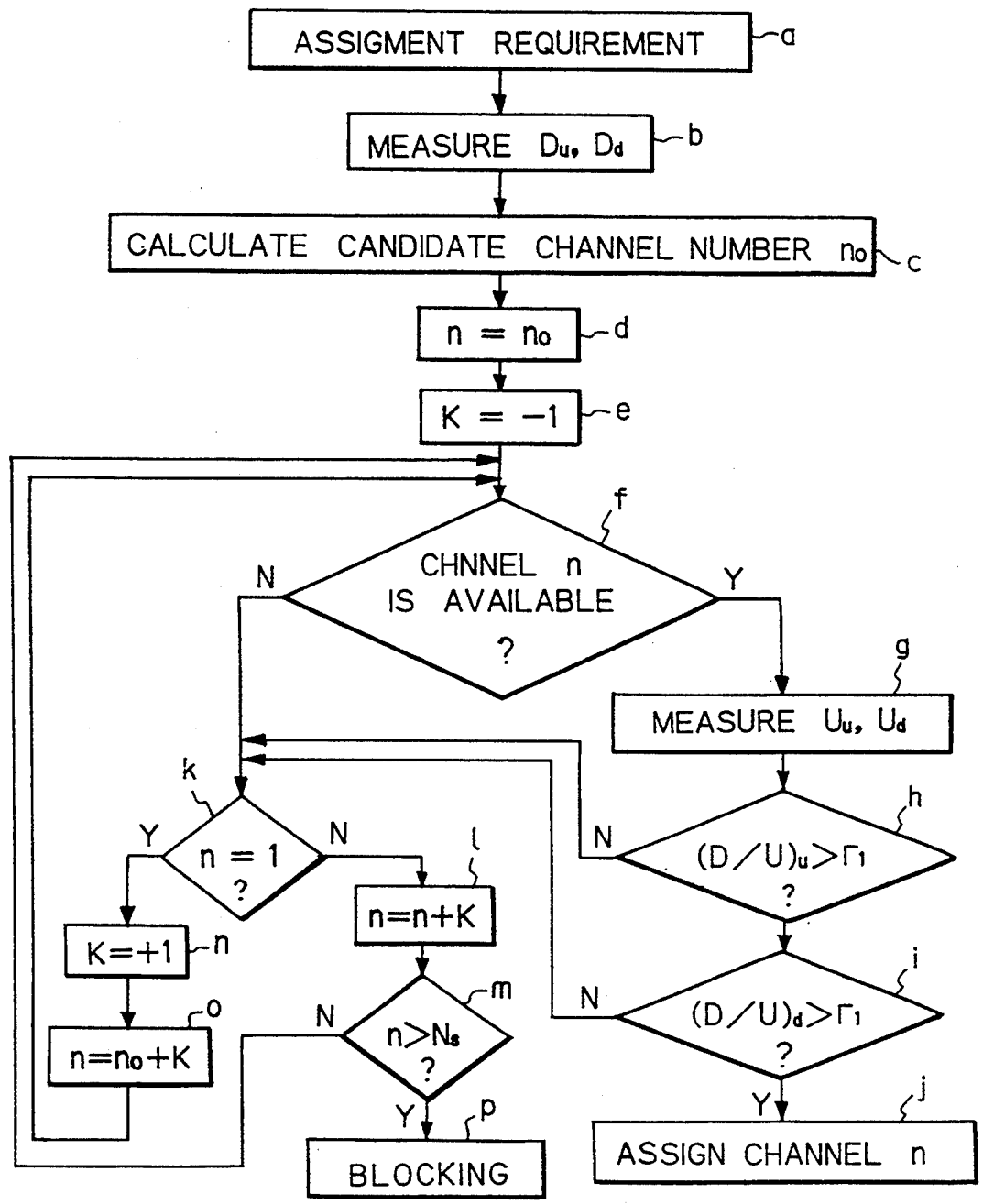
FIG. 4 is a flow chart showing an embodiment of a radio channel assigning method according to the invention.

FIG. 4 is a flow chart showing in detail the operation carried out in the radio channel assignment controller 20 (FIG. 2) or 24 (FIG. 3).

Upon the issuance of the radio channel assignment requirement when a call is originated or received (Step a), the received electric field intensities $D_u$, $D_d$ are measured respectively in the BS and MS and the measured values are transmitted to the radio channel assignment controller (Step b). The "u" subscript denotes "up-link", and a "d" subscript denotes "down-link". The radio channel assignment controller calculates the propagation loss L at a current position of the MS based on either one of the received electric field intensities or an average value thereof and a transmitting power value corresponding thereto, and obtains the primary candidate $n_o$ for an assignment channel in accordance with the equation (7) (Step c). The controller puts the obtained channel number $n_o$ into a retrieved channel number n (Step d) and put −1 into a parameter K representing a retrieval direction (Step e).

In Step f, it is discriminated whether the channel n is already in use in the BS. If that channel is available, the controller instructs the BS and MS to measure interference levels $U_u$, $U_d$ with respect to the channel n, and receives the measurement values (Step g). It is discriminated whether the up-link CIR ($D_u/U_u$) is greater than a reference value $\Gamma_1$ based on the values $D_u$, $U_u$ (Step h). If the up-link CIR is greater than the reference value, it is discriminated whether the down-link CIR is greater than the reference value $\Gamma_1$ (Step i). If the down-link CIR is greater than the reference value, the channel n is assigned between the BS and the MS which have issued the assignment requirement (Step j).

If the channel n is not available in Step f, the up-link CIR is not greater than the reference value in Step h, or the down-link CIR is not greater than the reference value in Step i, the retrieved channel number n is renewed in the processings of Steps k to m, and the discrimination is made in each of Steps f to i again.

In the processing of Steps k to m, since discrimination results of Steps k and m are negative while n does not reach a minimum value of 1 or a maximum value of $N_s$, the processing of Step 1 is carried out repeatedly. In Step 1, the search is made in an inward direction of the concentric circles (see FIG. 1) since the parameter K is initially set at −1 in Step e. The search direction is reversed in Step n when n becomes equal to 1 in Step k, and $n_o+1$ is put into n to thereby conduct the retrieval in an outward direction. When n becomes equal to $N_s$ in Step m, this means that all the channel are unassignable, resulting in the blocking (Step p).

According to the search method shown in FIG. 4, the retrieval is carried out in the inward direction starting from $n_o$ and then in the outward direction outside $n_o$. Alternatively, the retrieval may be carried out alternately in the inward and outward directions starting from $n_o$. In the former method, it is intended to spatially pack as many radio channels as possible by giving priority to smaller clusters, whereas in the latter method, it is intended to assign as many channels closer to $n_o$ as possible rather than to make the cluster smaller. Alternatively, the retrieval sequence may be modified suitably according to the number of available channels, the traffic distribution inward and outward of zones, and the blocking rate.

Figure 5:
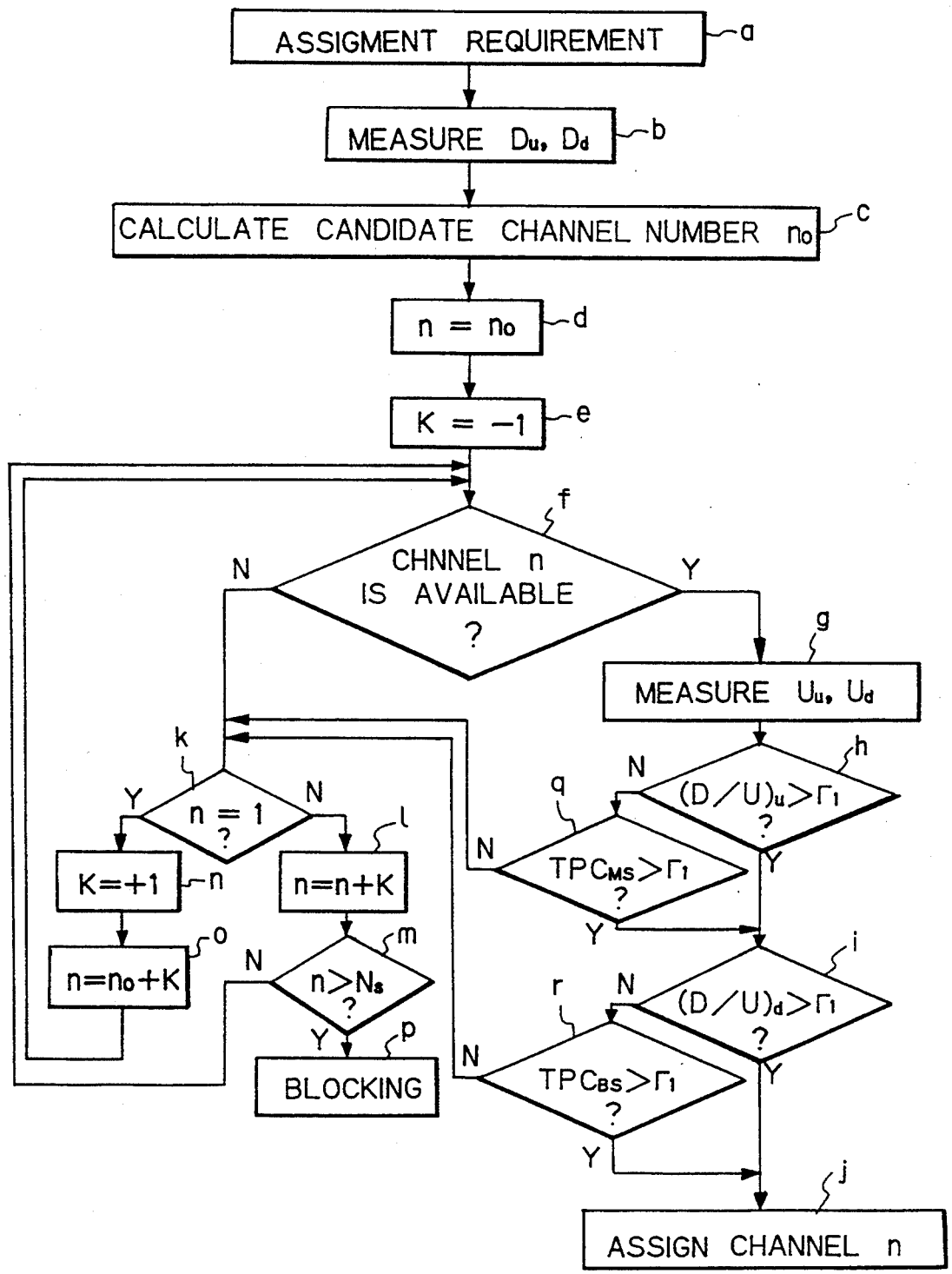
FIG. 5 is a flow chart showing another embodiment of the radio channel assigning method according to the invention.

FIG. 5 is a modification of the operation shown in FIG. 4. This operation includes a transmitter power control (TPC) which enables the channel assignment by increasing the transmitting power when the received power condition is not satisfied in Step h or i.

More specifically, if the up-link CIR is not greater than the reference value $\Gamma_1$ in Step h, it is discriminated whether the up-link CIR will become greater than the reference value $\Gamma_1$ by increasing the transmitting power of the MS (Step q). If the discrimination result is positive, this routine proceeds to Step i. If the down-link CIR is greater than the reference value $\Gamma_1$ in Step i, it is discriminated whether the down-link CIR will become greater than the reference value $\Gamma_1$ by increasing the transmitting power of the BS (Step r). If the discrimination result is positive, the transmitting power is increased until the up- and/or down-link CIR becomes equal to the reference value $\Gamma_1$ and the channel n is assigned (Step j).

Figure 6:
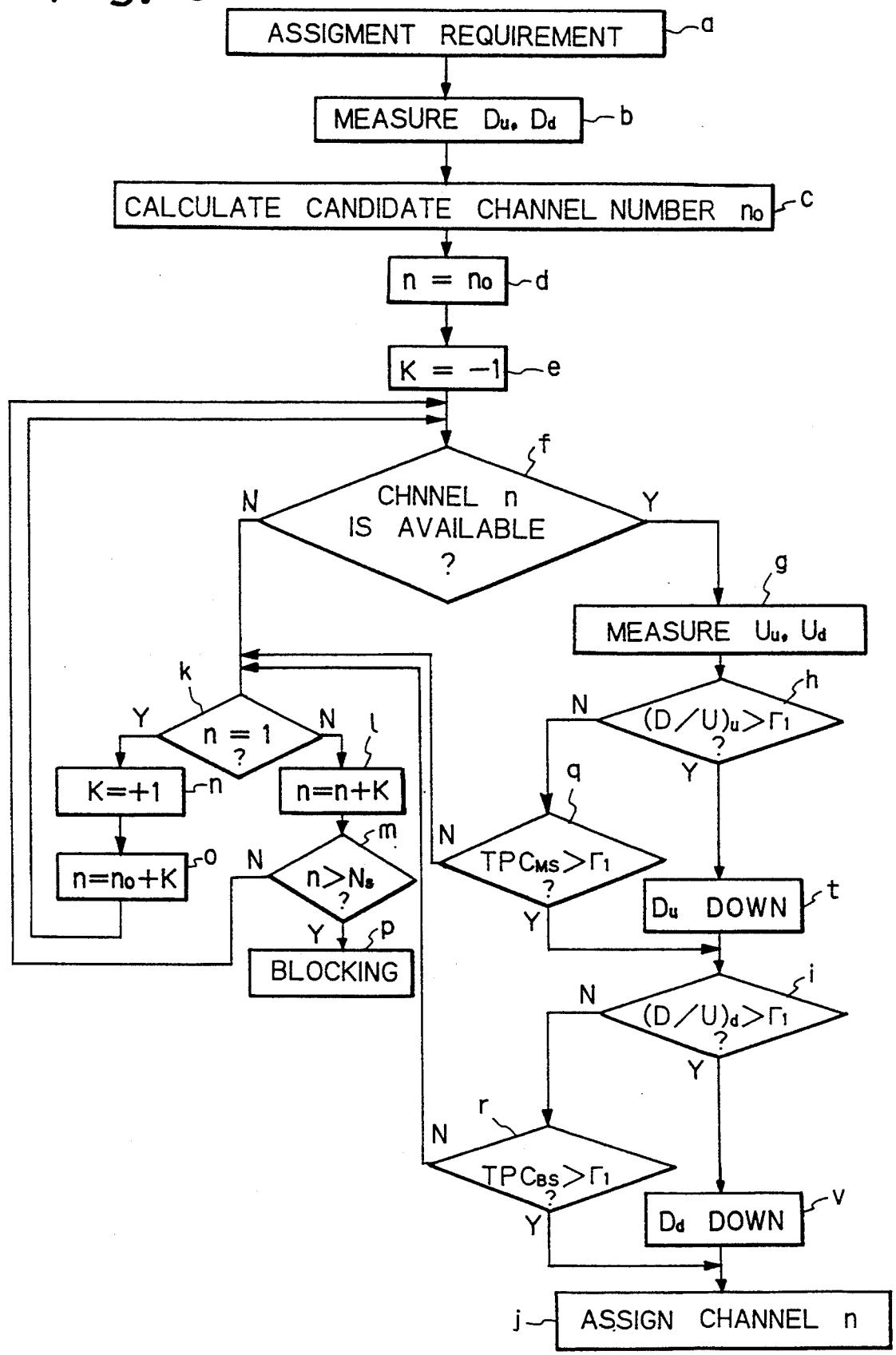
FIG. 6 is a flow chart showing another embodiment of the radio channel assigning method according to the invention.

FIG. 6 is a modification of the operation shown in FIG. 5. A TPC of decreasing the transmitting power is executed when the CIR becomes greater than a reference value even by decreasing the transmitting power. When the transmitting power is unnecessarily large, the interference level is increased in the other zones. In addition, if the transmitting power of the MS close to the BS is excessively large, the excessively large transmitting power may affect other channels. This TPC is effective in the above cases.

If the up-link CIR is greater than a reference value $\Gamma_1$ in Step h, it is discriminated whether the up-link CIR is excessively greater than a reference value $\Gamma_1$. If the discrimination result is positive, the TPC is executed to decrease the transmitting power of the MS until the up-link CIR becomes equal to the reference value $\Gamma_1$ (Step t). If the down-link CIR is greater than the reference value $\Gamma_1$ in Step i, it is discriminated whether the down-link CIR is excessively greater than the reference value $\Gamma_1$. If the discrimination result is positive, the TPC is executed to decrease the transmitting power of the BS until the down-link CIR becomes equal to the reference value $\Gamma_1$ (Step v).

We used computer simulation to evaluate the performance of the channel assignment system according to the present invention. Here, we summarize the simulation model and conditions, and present the results.

Figure 7:
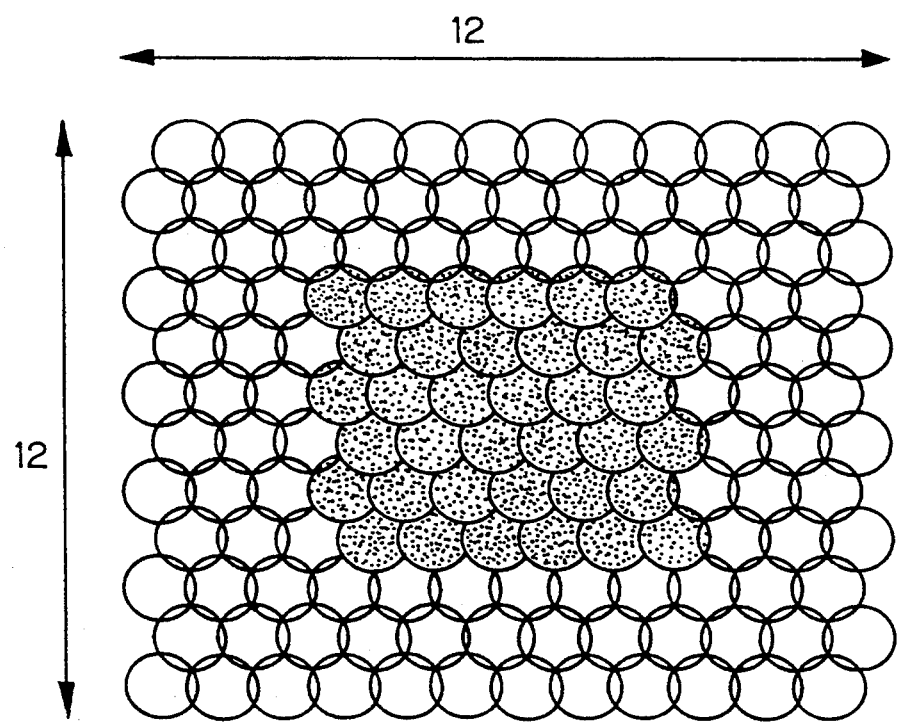
FIG. 7 is a concept diagram showing a simulation condition.

We considered the cell layout in FIG. 7. The main items specifying the simulation model are given in Table 1. The system consists of 144 (12×12) omnidirectional cells with radii of 500 m. Our simulation model contains 70 usable radio channels. Statistical data is acquired from the 36 (6×6) cells in the system's central portion (shaded in FIG. 7) to avoid the "edge effect" (D. C. Cox and D. O. Reudink, "Dynamic Channel Assignment in Two-Dimensional Large-Scale Mobile Radio Systems," B. S. T. J., 51, pp. 1611–1629, 1972.)

TABLE 1

| Simulation conditions | |
|---|---|
| Number of channels ($N_6$) | 70 |
| Cellular form | Omnidirectional |
| Cellular radius | 500 m |
| Number of Cells | 144 (12 × 12) |
| Data acquisition | Central 36 (6 × 6) cells |
| Path loss exponent (a) | 3.5 |
| Standard deviation ($\sigma$) | 6.5 dB |
| Traffic distribution | Uniform |
| Call attempt process | Poisson |
| Call duration | Negative exponential |
| Mean duration | 120 s |
| Required CIR ($\Gamma_0$) | 10 dB |
| CIR reference value ($\Gamma_1$) | 13 to 19 dB |

We excluded automotive MSs because the portable MSs used by pedestrians dominate the numbers of cellular system now in use. This allows us to assume that the MS is stationary for the call duration. Therefore, the received signal strength is described by the superposition of the long-term variation, which is proportional to a power law function of transmitter and receiver separation, and shadowing which is subject to a log-normal (or dB-gaussian) distribution. In the simulations, we used an exponent of the long-term variation, a, of 3.5, and a standard deviation of the log-normal distribution, $\sigma$, of 6.5 dB.

The traffic distribution is made uniform over the system and call attempts random. So, the number of new call attempts in a certain time (1 second in our simulation) is subject to the Poisson distribution. Call duration has a negative exponential distribution with a mean of 120 seconds.

The minimum CIR ($\Gamma_0$) to maintain adequate link quality was assumed to be 10 dB. The CIR reference value, $\Gamma_1$, is a system parameter and is greater than $\Gamma_0$. The difference between $\Gamma_1$ and $\Gamma_0$, $\Delta\Gamma$, is the margin. If $\Delta\Gamma$ is too large, only a few channels can exceed $\Gamma_1$, resulting in the blocking of most call attempts, even if the probability that CIR drops below $\Gamma_0$ during a call is made very low. We use Kanai's definition and call this probability of CIR degradation the interference probability, $P_I$ (T. Kanai, "Autonomous Reuse Partitioning in Cellular Systems," 42nd IEEE VTC, pp. 782–785, 1992.). $P_I$ is the ratio of the number of the events of intolerable interference to the number of calls served. If $\Delta\Gamma$ is too small, the situation reverses. Therefore, $\Gamma_1$ can be used to control the trade-off between system capacity and link quality. However, it is expected that $\Delta\Gamma$ is on the same order as $\sigma$, i.e., 6.5 dB. Here we chose $\Delta\Gamma$ of 6 dB for a preliminary, $\Gamma_1$ of 16 dB. We varied $\Delta\Gamma$ in the range 6±3 dB, so $\Gamma_1$ ranged from 19 dB to 13 dB.

The contribution from the initial state to a statistically steady system is eliminated, since the system is initially empty and no call blocking can occur. We started data acquisition after 100 call blockings were measured for the central 36 cells.

Figure 8:
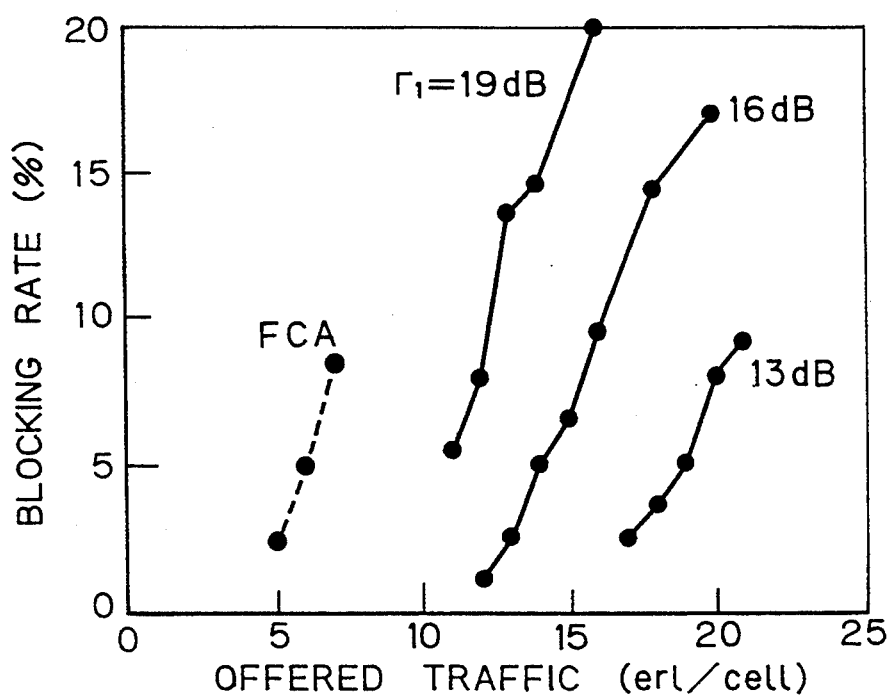
FIG. 8 is a graph showing a blocking rate characteristic in simulation results.
Figure 9:
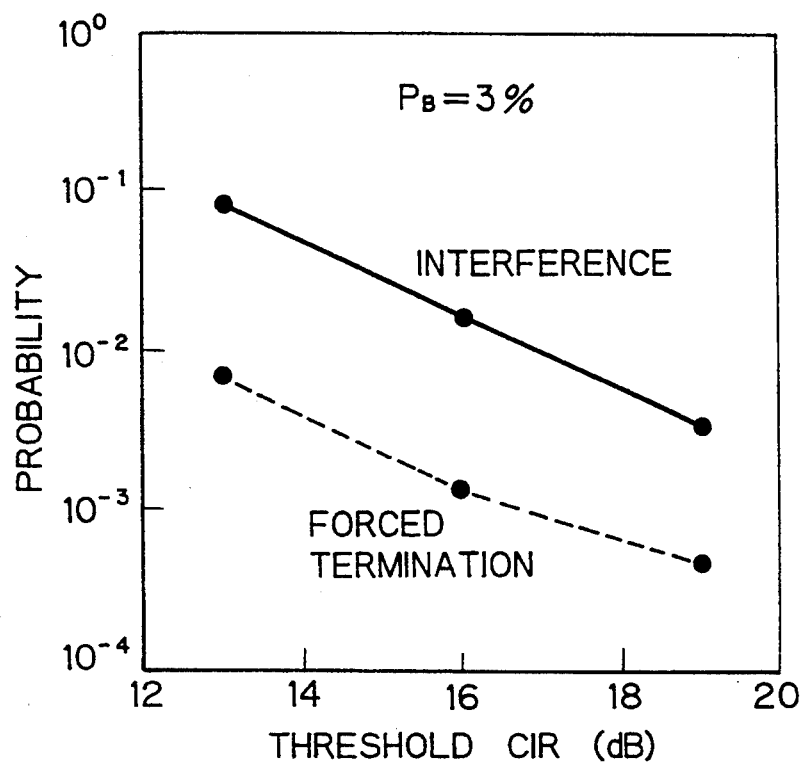
FIG. 9 is a graph showing an interference probability characteristic in the simulation results.

Simulation results showing the relationship between offered traffic and blocking rate ($P_B$) are plotted in FIG. 8. The FCA performance is also shown for comparison. Since a 7-cell cluster is assumed for FCA, every cell has 10 channels defined. Here we define the system capacity as the level of offered traffic at a blocking rate of 3%. This definition is tentative, however, because inacceptably high forced termination probability may limit the offered traffic instead of the blocking rate. When a CIR degradation below $\Gamma_0$ is detected during a call, an intracell handoff (switching the current radio channel to another) is made. If no channel is available for that call, it is forcedly terminated. The forced termination probability, $P_F$, is the ratio of the number of forcedly terminated calls to the number of calls served. The interference and forced termination probabilities at $P_B=3\%$ (obtained with the same simulation data as in FIG. 8) are plotted in FIG. 9. For $\Gamma_1=16$ dB and 19 dB, the $P_I$ values are less than 3% with $P_F$ values less than 0.5%. These values are acceptable for practical systems. From FIGS. 8 and 9, we can say that the channel assignment system according to the present invention improves the system capacity by a factor 2.5 as compared to the conventional FCA capacity when $\Gamma_1$ is 16 dB.

Figure 10:
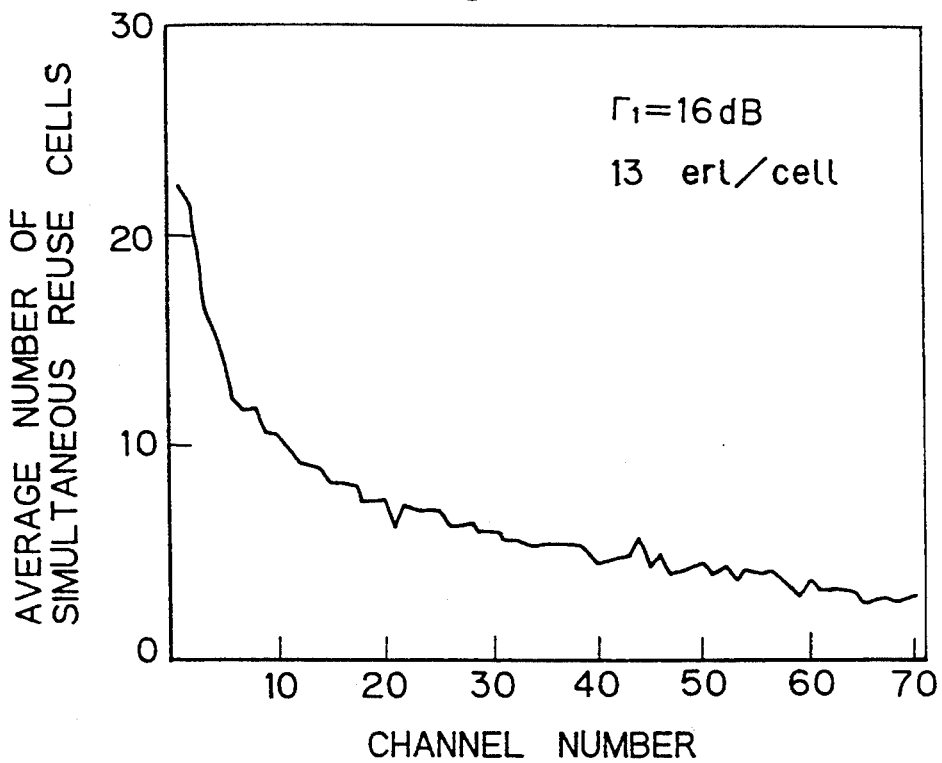
FIG. 10 is a graph showing distribution of the used channels in the simulation results.

The channel reuse characteristics are shown in FIG. 10. As shown, the equivalent cluster size of each channel is the number of cells, 36, divided by the ordinate value. The FIG. 10 shows that the channel assignment system according to the present invention accomplishes an RUP with a reuse factor which varies continuously with the channel number (the nominal location of the channel).

Figure 11:
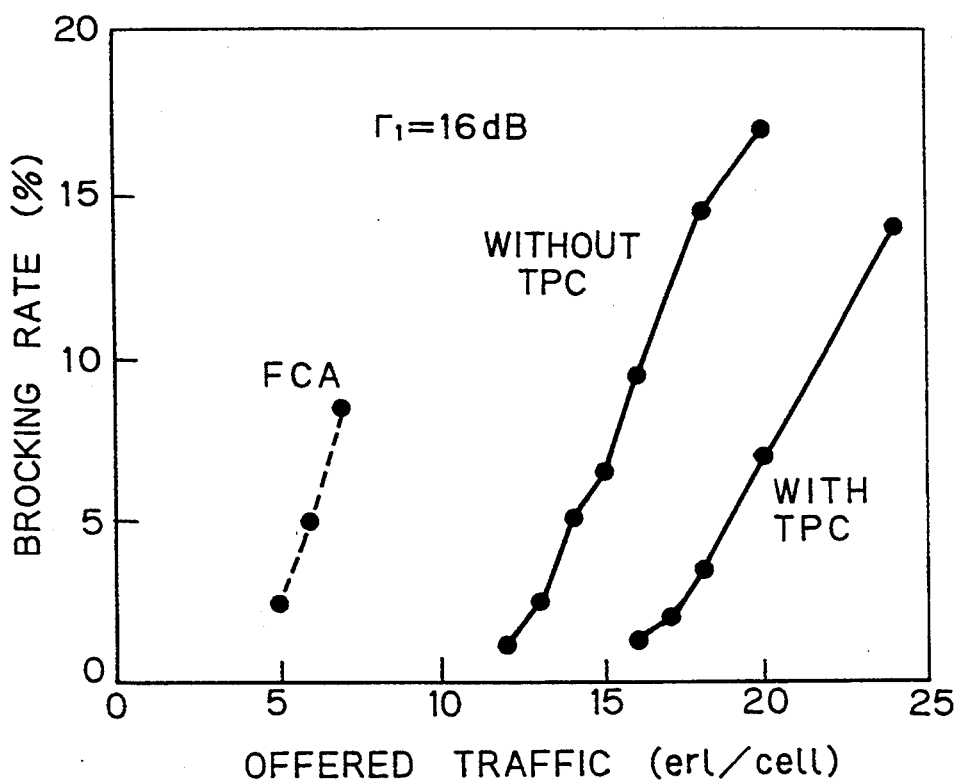
FIG. 11 is a graph showing effects of TPC in the simulation results.

We again performed computer simulation, to evaluate the performance of the channel assignment of the present invention used with TPC. In the simulations, we assumed ideal TPC implementation, i.e., the controllable range is 0 dB to infinity and the control step is infinitesimal. Simulation results for $\Gamma_1=16$ dB are shown in FIG. 11, where performances of FCA and the channel assignment of the present invention without TPC are also plotted for comparison. The system capacity is increased to 17.4 erl/cell which corresponds to an improvement factor of 3.4 over FCA. The interference probability is 4% and forced termination rate is 0.5%. These values are slightly degraded. This can be expected from FIG. 9, because the TPC decreases the excessive CIR margin. These degradation levels are easily within tolerable limits. Hence, TPC can contribute to enhanced system capacity in cooperation with the channel assignment of the present invention.

In the case where the radius of the concentric circle where a calling or called MS is located may vary greatly because of the movement of the MS during the communication, the received electric field intensity is continuously monitored in the MS (and/or BS). When the large variation in the received electric field is detected, the channel assignment control is carried out again. In the case where a more suitable radio channel is assignable, the channel is switched.

In the case where the very distant radio channel has been assigned because of the unavailability of the radio channel corresponding to the concentric circuit where the MS is located and its neighboring channels, the assigned radio channel is preferably switched to the radio channel which should have been originally assigned or its neighboring radio channel as soon as it is available.

Figures 12A, 12B, 12C:
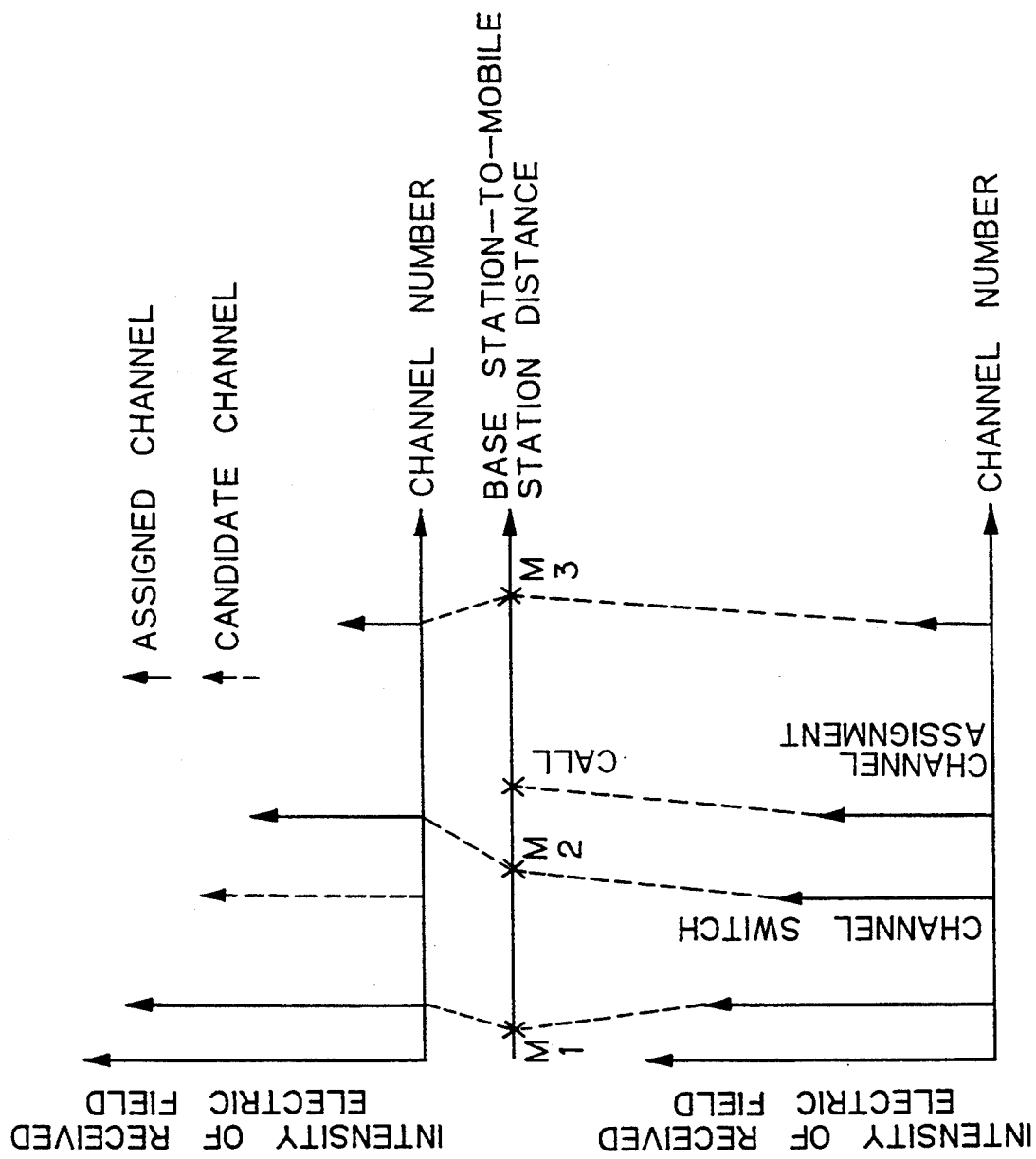
FIGS. 12A, 12B and 12C are charts for explaining a radio channel rearranging method according to the invention.

In addition, in the case where the channel assignment requirement is issued when the call is originated and the radio channel at a position indicated by broken line is determined as an assignment channel as shown in FIG. 12A; and where the MS-to-BS distances are in the order as shown in FIG. 12B at this time; then, as shown in FIG. 12C, it is desirable to determine a new combination of correspondence between the radio channels and the MSs from among the already assigned channels and the candidate for the assignment channel according to positions of the MSs, and to assign the channels according to the new combination of correspondence. At this time, it is desirable to carry out this processing not only upon the issuance of the assignment requirement but also at specified time intervals with respect to all the assigned channels.

The variations in the average reception level (dependent upon the MS-to-BS distance) and the frequency of transferring from the radio zone covered by a BS connected to an MS to the neighboring radio zone (handoff) during the communication depend upon a moving speed of the MS. In a high speed MS station, the average reception level varies greatly during a short period of time and the frequency of the handoff is high. On the other hand, in a low speed or stationary MS, the average reception level is substantially constant during the phone communication and the handoff hardly occurs. Since the high speed MS drags the radio channel assigned at the start of the phone communication to a place distant from the position where the phone communication is started, the high speed MS is not only subject to interference degradation but also gives interference to the other stations using the same radio channel to thereby cause interference degradation in those stations.

In an automobile/portable telephone system, the number of portable MS is overwhelmingly large. Accordingly, it would be reasonable that the change in quality of radio circuits caused by the high speed MSs should be solved by a switch control of the radio of the radio channels of the high speed MSs.

Thus, if the MS is determined to be a high speed mobile body after the detection of the moving speed of the MS, a time required to move over a distance of, for example, about 1/10 of the size of the radio zone is calculated and the radio channel suitable for the position of the high speed mobile station at each time is reassigned at intervals of the calculated time. In this way, optimum radio channel assignment can be reaslized at the above time intervals.

Alternatively, the moving distance of the MS may be detected. The radio channel suitable for the position of the MS is reassigned, every time the MS travels over a moving distance corresponding to, for example, about 1/10 of the size of the radio, zone, thereby realizing the optimum radio channel assignment at each time.

Figure 13:
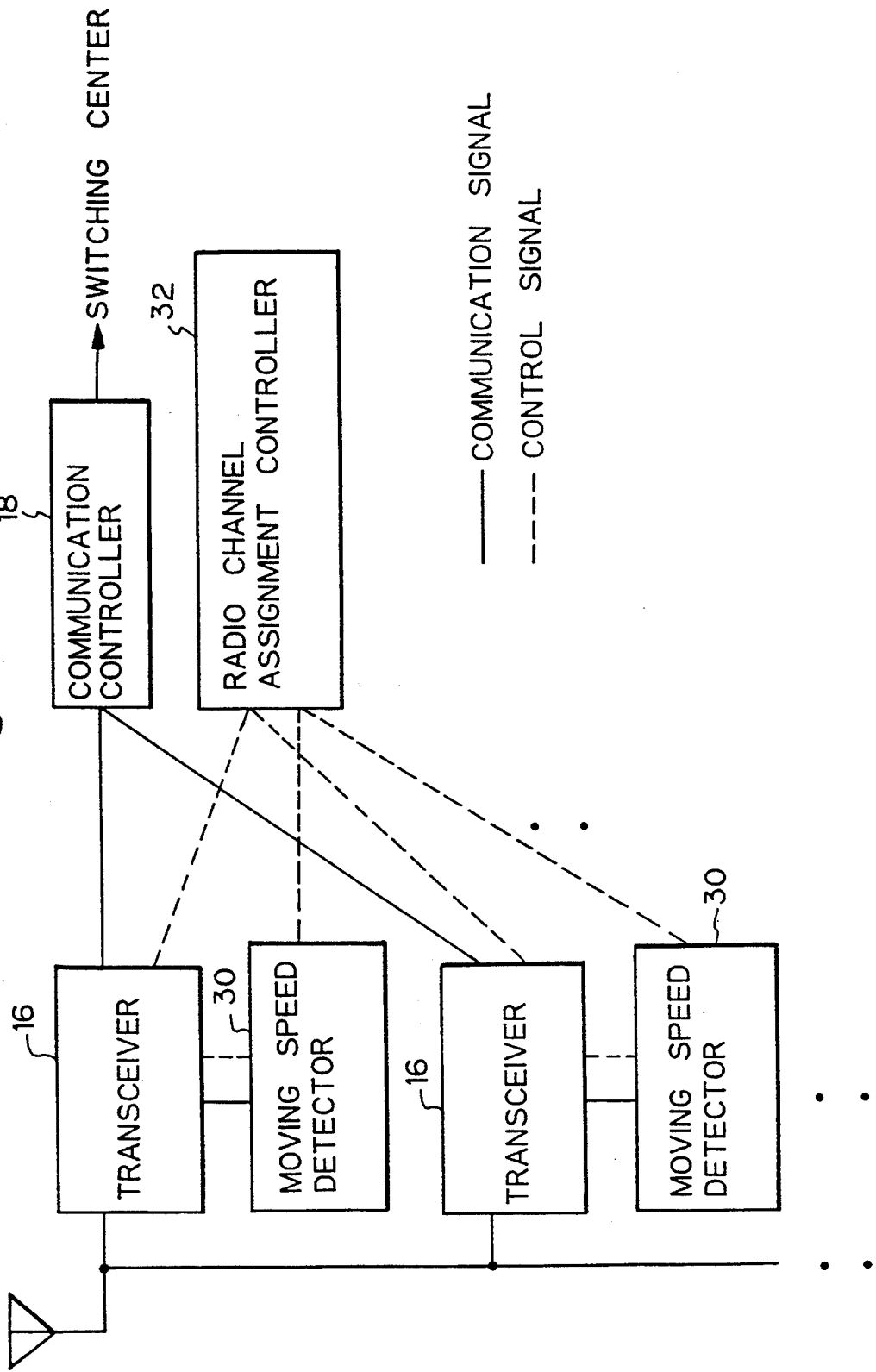
FIG. 13 is a diagram showing another exemplary construction of the mobile communication system according to the invention.

FIG. 13 shows an exemplary construction of a mobile communication system corresponding to the mobile communication system shown in FIG. 2 when the moving speed is detected to switch the channels.

A moving speed detector 30 shown in this figure has a function of detecting the moving speed based on a reception level of a reception signal from a transceiver 16 in the case where the moving speed is detected in the BS. Alternatively, a moving speed detector having a similar function may be provided in the MS in the case where the moving speed is detected in the MS, and the BS is informed of the obtained moving speed through a control channel of the radio circuit. In this case, the BS extracts moving speed information of the MS from the received data in the moving speed detector 30. In either case, the obtained moving speed information is sent to a radio channel assignment controller 32 in which the radio channels are assigned and switched according to the moving speed, as described later.

The reception level of the radio circuit in the mobile communication is generally said to be affected by Rayleigh fading. In Rayleigh fading, the number of times of crossing a specified reference level within a unit time (level crossing rate) depends upon the moving speed, and the level crossing rate N is at maximum when the reference level is set equal to the average received power as follows.

$$N \approx f_D [times/sec]$$

where $f_D$ denotes a Doppler frequency. If the wavelength of the radio wave is assumed as $\lambda$ [m] and the moving speed as v [m/s], the Doppler frequency is expressed as follows.

$$f_D = V/\lambda [Hz]$$

Accordingly, the level crossing can be detected by calculating the average power based on the reception level obtained from the transceiver and comparing the average power with the instantaneous reception level. The moving speed can be detected by calculating the level crossing rate.

Figure 14:
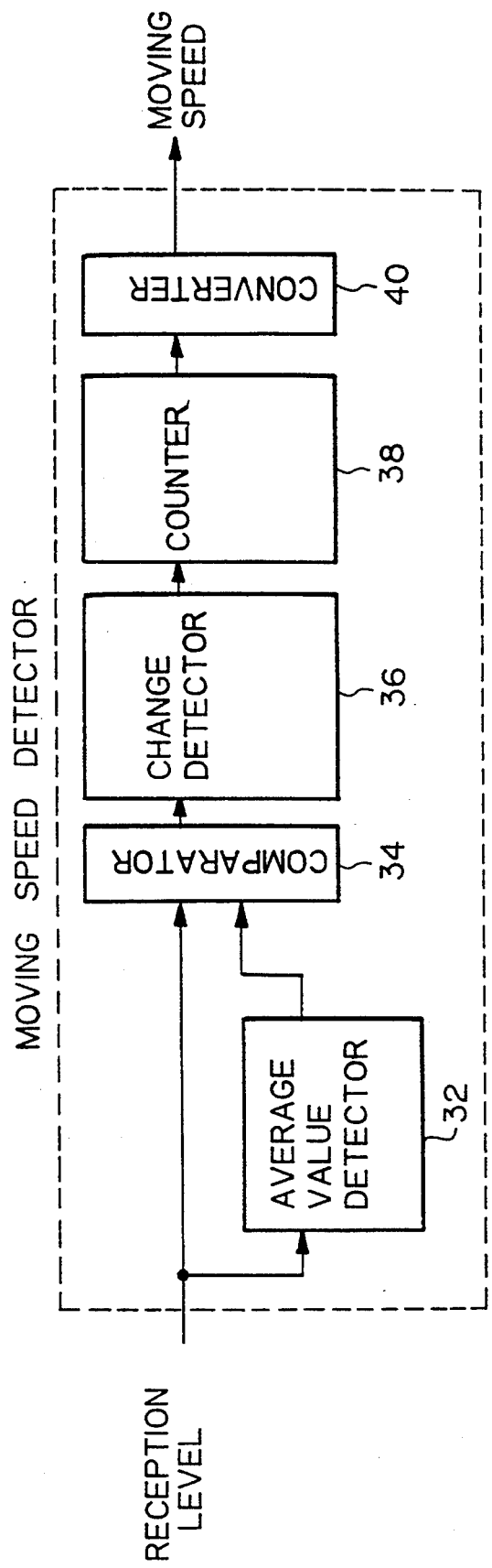
FIG. 14 is a block diagram showing a construction of a moving speed detector 30 shown in FIG. 13.

FIG. 14 shows an exemplary construction of the moving speed detector provided in the BS or MS.

In an average value detecting unit 32, the average power level is detected. The received power level is compared with the average power level in a comparator 34, and the comparison result is output therefrom. A pulse is output when the comparison result changes in a change detector 36, and the number of pulses within a unit time is counted in a counter 38. In a converter 40, the count value is converted into a moving speed and output.

Figure 15:
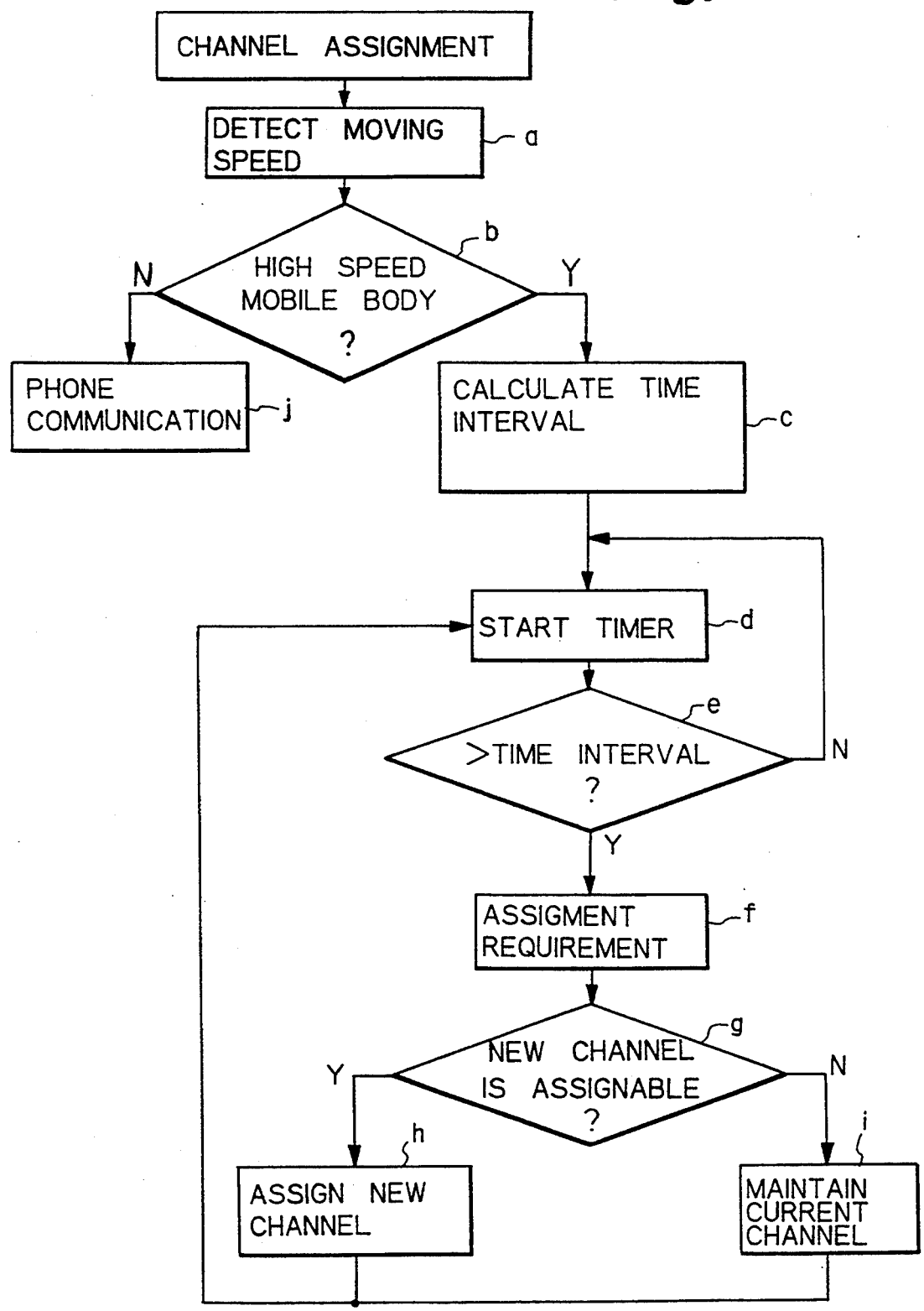
FIG. 15 is a flow chart showing an operation of a radio channel assigning apparatus 32 shown in FIG. 13.

FIG. 15 shows an example of a control flow in the radio channel assignment controller 32 shown in FIG. 13.

After the radio channel is assigned through the operations shown in FIGS. 4, 5 or 6, the moving speed of the MS is input from the moving speed detector 30 in Step a. In Step b, the moving speed is compared with a predetermined threshold value. If the moving speed of the mobile body is not greater than the predetermined threshold value, it is determined that the MS is not a high speed mobile body and the phone communication is continued in Step j. If the MS is determined to be the high speed mobile body, a time required to move over a distance of, for example, about 1/10 of the size of the radio zone is calculated as a channel switching time interval (Step c). After the start of a timer in Step d, a value of the timer is read. The processings of Steps d and e are repeated until the read timer value becomes in excess of the time interval calculated in Step c. When the timer value becomes in excess of the time interval, the assignment channel is determined in accordance with the operations shown in FIGS. 4, 5 or 6 in Step f. If a new channel is assignable, that channel is assigned; the timer is cleared; and this routine returns to Step d. If the new channel is unassignable, the current channel is maintained; the timer is cleared; and this routine returns to Step d.

Figure 16:
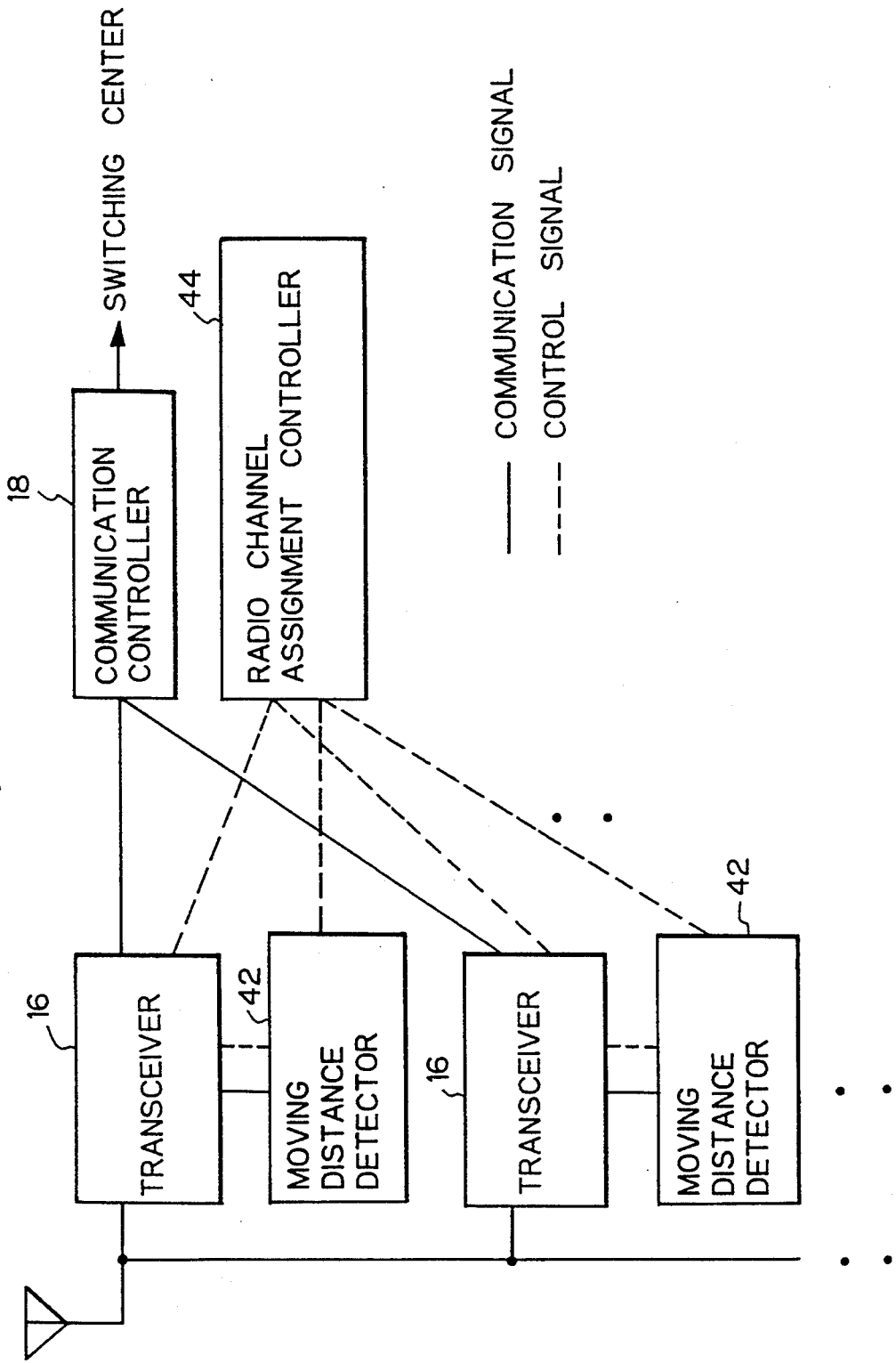
FIG. 16 is a diagram showing another exemplary construction of the mobile communication system according to the invention.

FIG. 16 shows an exemplary construction of a mobile communication system corresponding to the mobile communication system shown in FIG. 2 in the case where the moving distance is detected to switch the channels.

A moving distance detector 42 shown in this figure has a function of detecting the moving distance based on a reception level of a reception signal from a transceiver 16 in the case where the moving distance is detected in the BS. Alternatively, a moving distance detector having a similar function is provided in the MS in the case where the moving distance is detected in the MS, and the obtained moving distance is relayed to the BS through a control channel of the radio circuit. The BS extracts the moving distance information, from the received data in the moving distance detector 42. In either case, the obtained moving distance information is sent to a radio channel assignment controller 44 in which the radio channels are assigned and switched according to the moving distance, as described later.

Figure 17:
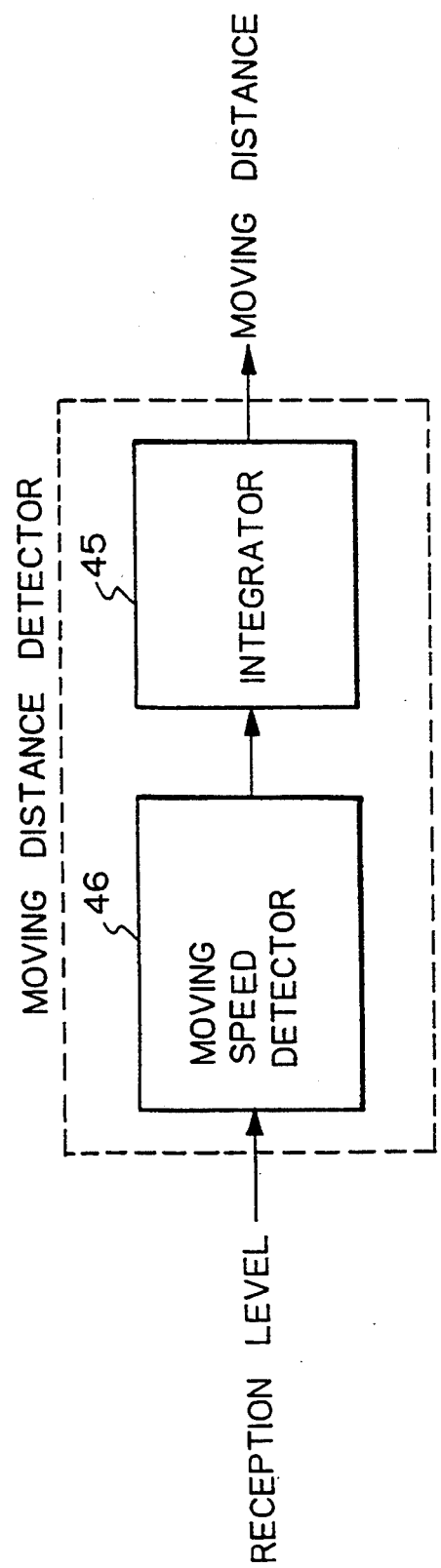
FIG. 17 is a block diagram showing a construction of a moving distance detector 42 shown in FIG. 16.

FIG. 17 shows an exemplary construction of the moving distance detector provided in the BS or MS. A moving speed detector 46 calculates and outputs the moving speed of the MS based on the reception level. An integrator 48 integrates the moving speed with respect to time and outputs the resultant as a moving distance.

Figure 18:
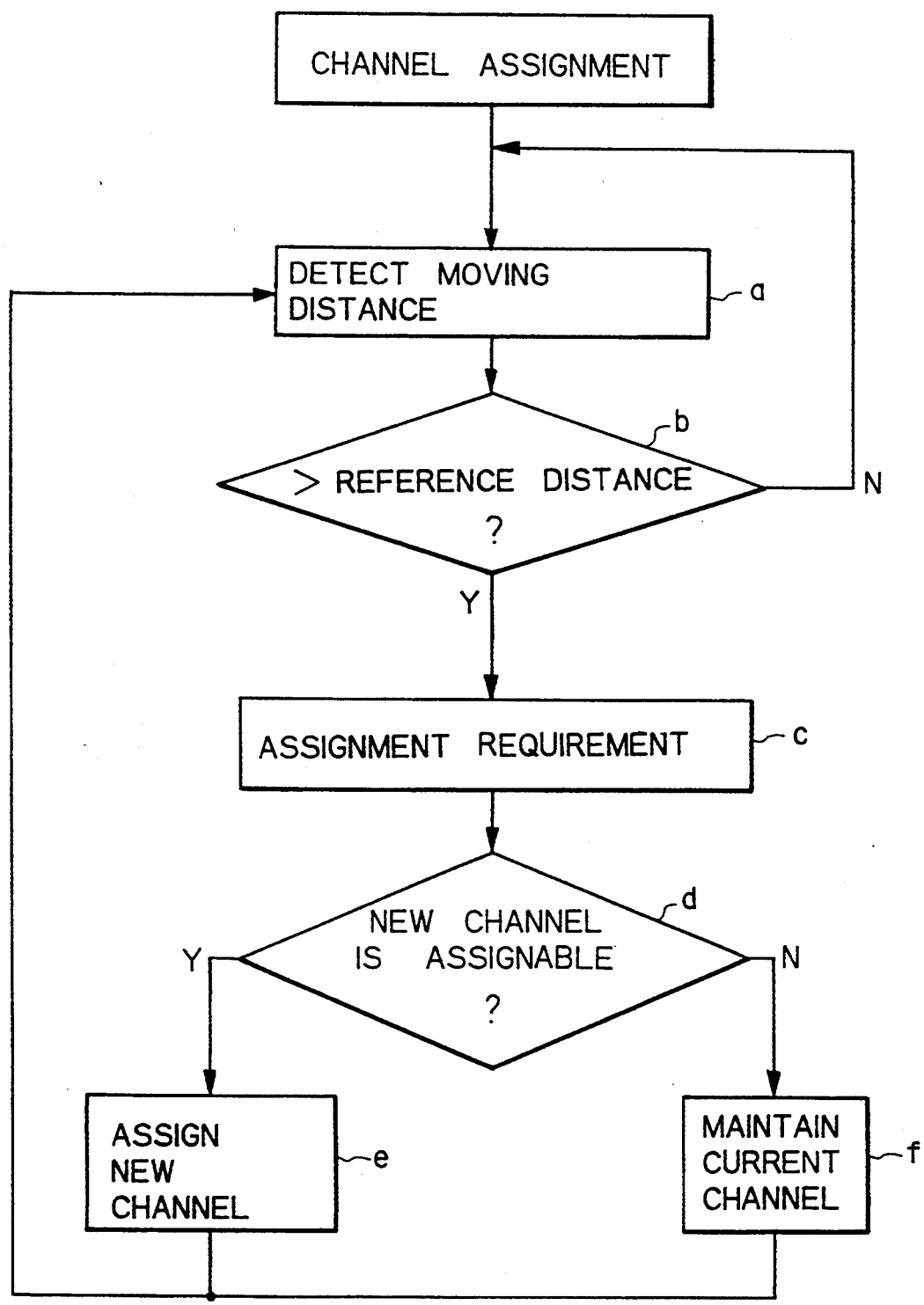
FIG. 18 is a flow chart showing an operation of a radio channel assignment controller 44 shown in FIG. 16.

FIG. 18 shows an example of control flow in the radio channel assignment controller 44 showin in FIG. 16.

After the radio channel is assigned through the operations shown in FIGS. 4, 5 or 6, the moving distance of the MS is input from the moving distance detector 42 in Step a. Processings of Steps a, b are repeated until the moving distance becomes in excess of a predetermined reference distance. As this reference distance is used a distance of 1/10 of the size of the radio zone. When the moving distance becomes in excess of the reference distance, the assignment channel is determined in accordance with the operations shown in FIGS. 4, 5 or 6 in Step c. If a new channel is assignable, that channel is assigned; the moved distance is reset; and this routine returns to Step a. If the new channel is unassignable, the current channel is maintained; the moved distance is reset; and this routine returns to Step a.

What is claimed is:

1. A method of assigning radio channels between mobile stations and base stations in a mobile communication system, the radio channels being assignable as resources shared by all of the mobile stations, comprising the steps of:
   i) determining respective correspondences between quantized distances between the mobile stations and the base stations and the radio channels in said communication system;
   ii) determining a distance between one of said mobile stations and a base station between which a radio channel is to be assigned;
   iii) selecting a candidate channel for the radio channel to be assigned, using the distance determined in step ii) in accordance with the correspondence determined in step i);
   iv) testing whether an assignment condition is satisfied such that the candidate channel for the radio channel to be assigned is not in use in the base station and satisfies a predetermined reception condition;
   v) changing the candidate channel in accordance with a predetermined order if the assignment condition in step iv) is not satisfied;
   vi) repeating the steps iv) and v) until the assignment condition is satisfied or all of the radio channels are tested; and
   vii) assigning the candidate radio channel that first satisfies the assignment condition in step iv) between the mobile station and the base station.

2. A method according to claim 1, further comprising the step of switching from the candidate radio channel which was assigned in step vii) to another radio channel, if the quality of the assigned radio channel degrades during a call.

3. A method according to claim 1, wherein the step iv) includes the substep of testing whether the reception condition is satisfied if transmission power is increased, when the reception condition is not satisfied.

4. A method according to claim 1, wherein step iv) includes the substep of testing whether the reception condition is still satisfied when transmission power is decreased.

5. A method according to claim 1, further comprising the step of increasing transmission power if the quality of the candidate radio channel which was assigned in step vii) degrades during a call when the transmission power is decreased.

6. A method according to claim 1, further comprising the steps of again executing steps ii) to vii) if said one mobile station moves after step vii).

7. A method according to claim 1, further comprising the step of switching from the candidate radio channel which was assigned in step vii) to another radio channel preceding the assigned radio channel in the predetermined order when said another of the preceding radio channels becomes available after step vii) has been completed.

8. A method according to claim 1, further comprising the step of switching said radio channel assigned to said one mobile station coupled to a base station if a relationship between an order of assigned radio channels and an order of distances to the base station conflicts with the respective correspondence determined in step i).

9. A method according to claim 1, wherein the distance determined in the step ii) is an estimated distance based on received electric field intensity.

10. A method according to claim 1, wherein the distance determined in the step ii) is a physical distance.

11. A method according to claim 1, further comprising the steps of:
   ix) detecting a moving speed of said one mobile station after the step vii);
   x) calculating a time required for said one mobile station to move over a predetermined distance based on the detected moving speed; and
   xi) carrying out the steps ii) to vii) upon each lapse of the calculated time.

12. A method according to claim 1, further comprising the steps of:
   ix) detecting a moving distance of said one mobile station after the step vii); and
   x) carrying out the steps ii) to vii) each time the detected moving distance becomes in excess of a predetermined distance.

13. An apparatus for assigning radio channels between a plurality of mobile stations and a plurality of base stations in a mobile communication system, the radio channels being assignable as resources shared by all of the mobile stations, comprising:
   means for storing data of correspondence between quantized distances between the mobile stations and the base stations and the radio channels in said communication system;
   means for determining a distance between one of said mobile stations and a base station between which a radio channel is to be assigned;
   means for determining a candidate channel for the radio channel to be assigned, using the distance determined by the means for determining the distance in accordance with the correspondence stored in the means for storing; and
   means for retrieving the candidate radio channel from said data, wherein said candidate radio channel is not in use in the base station and satisfies a predetermined reception condition, starting from the candidate determined by the candidate determining means, in accordance with a predetermined order.

14. An apparatus according to claim 13, wherein the radio channels for each of the base stations are assigned.

15. An apparatus according to claim 13, said apparatus being connected with one of the plurality of base stations and assigning the radio channels for the connected base station.

16. An apparatus according to claim 13, further comprising:
   means for detecting a moving speed of said one mobile station;
   means for calculating a time required for said one mobile station to move over a predetermined distance based on the moving speed determined by the moving speed detection means: and
   means for activating the distance determination means, the candidate determination means, and the retrieval means upon each lapse of the time calculated by the time calculation means.

17. An apparatus according to claim 13 further comprising:
means for detecting a moving distance of said one mobile station; and
means for activating the distance determination means, the candidate determination means, and the retrieval means each time the moving distance detected by the moving distance detection means becomes in excess of a predetermined distance.

* * * * *